United States Patent Office 2,800,399
Patented July 23, 1957

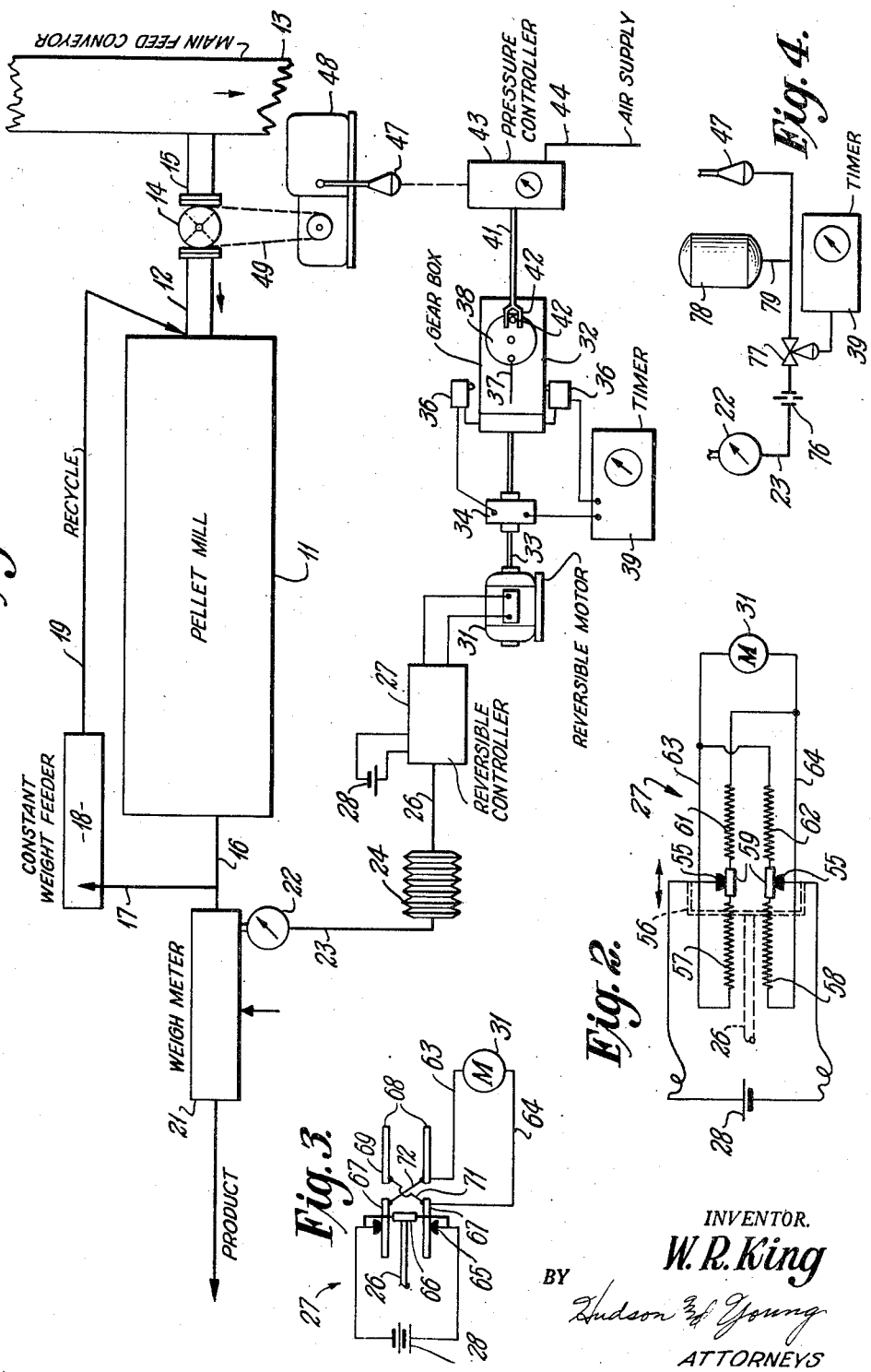
INVENTOR.
W. R. King

2,800,399

PROCESS FOR CONTROLLING FEED RATE TO PELLET MILL

William R. King, Bartlesville, Okla., assignor to Phillips Petroleum Company, a corporation of Delaware Application August 9, 1954, Serial No. 448,620

9 Claims. (Cl. 23—314)

This invention relates to an improved process for pelleting carbon black. A specific aspect of the invention pertains to a method for controlling the feed rate of loose carbon black to a pellet mill.

It is conventional to pellet loose carbon black produced in carbon black furnaces or reactors by feeding the black to a series of horizontally rotating cylindrical tumbling mills in which the black is pelleted as it passes from the feed end to the delivery end of the rotating mill. A portion of the effluent pellet stream is recycled to the feed end of the mill so as to provide nuclei for the pelleting process. One of the problems encountered in the pelleting of carbon black is a variation in pellet quality and variation in the production rate of pellets. These difficulties are largely due to the variable and extremely low density of the loose black as it comes from the collection system and is fed to the mill. These characteristics of the black make it extremely difficult to control the flow rate of feed to the mill and maintain a sufficiently uniform or constant feed rate to obtain the uniform quality and rate in the pelleted product. Up to the present time, no device for accurately controlling the flow rate of loose carbon black to a pelleting mill has been found.

Attempts to measure directly the loose black feed rate to a pellet mill usually result in an exotic control design, which while logical is not practical for industrial use. Attempts to measure the feed rate indirectly by the product rate are complicated by the influence of the recycle stream and have not been successful because of the system capacity which produces a time lag of the order of one to two hours between the feed rate change and the resultant change in product rate and quality. This invention is concerned primarily with a process for regulating the feed rate of carbon black to a pellet mill so as to obtain a more uniform production rate of higher quality pellets than has heretofore been possible.

It is an object of the invention to provide an improved process for regulating the flow rate of loose carbon black to a pellet mill. Another object is to provide an improved process for pelleting carbon black. A further object of the invention is to provide a novel device for controlling the speed and direction of rotation of an electric motor. It is also an object of the invention to provide a process for producing more uniform carbon black pellets of improved quality. Other objects of the invention will become apparent from a consideration of the accompanying disclosure.

As before stated, attempts to measure the feed rate of loose carbon black to a pellet mill directly, or to measure the flow rate of effluent pellets and regulate the flow rate of loose black feed directly in response thereto, have been unsuccessful in providing a practical process for industrial use. This invention comprises a process for efficiently controlling the flow rate of loose black to a pellet mill within limits which effect a more nearly uniform flow of effluent pellets of high quality than has heretofore been possible. The process comprises measuring the flow rate of effluent pellets from a pellet mill so as to obtain at any given time a required correction in the feed rate of loose black to the mill in order to maintain or effect a standard predetermined product flow rate for the mill, and making an adjustment in the feed rate which compensates for only a portion of the indicated or needed correction in the feed rate to the mill required to maintain said predetermined standard flow rate. The effluent pellet stream from the mill is passed over a flow rate indicator, such as a weigh meter, which sends out a signal of an intensity which is directly proportional to the rate of flow of pellets thru the device. The variation in the intensity of this signal from a signal of standard intensity is an indication of the correction needed in the flow rate of loose black to the feed end of the mill in order to return the mill to a standard production rate. Only a portion of this variation in intensity of the signal or of the indicated needed correction in the feed rate is translated to a variation in the feed rate to the mill. Thus, the device departs widely from the usual direct action and reaction principle used in the ordinary negative feedback controllers in conventional use. The principle involved may be best described by comparing the action of the device to a human operator who measures a product rate every 15 minutes and then makes a fractional adjustment in the feed rate in the proper direction to return the product rate to normal but does not attempt to make the full adjustment indicated by the measured rate. Repeated adjustments gradually bring the feed rate and product rate to the desired values, at which time measurements are continued but adjustments in the feed rate are discontinued until needed. Repeated experiences show that an attempt by the human operator to make the full adjustment indicated by the measured rate results in over-compensation and increasingly erratic rates. Naturally occurring variations in the feed rate, such as the change in black density as it comes from the collection system develop more slowly or require a longer period of time than the time lag between feed rate change and its reflection in product rate. Experience indicates that normal variations occur very slowly and over a period of the order of 2 to 4 times the mill lag. Sudden changes caused by conveyor blockages, recycle interruptions, etc., are beyond the control limits of this device and process; however, the gradual density drift normally experienced, which is the principal cause of variation in pellet production rate, is adequately compensated for by the process of the invention.

One embodiment of the invention utilizes a constant correction or adjustment in the feed rate to the mill which is not proportional to the indicated correction needed and is generally only a fraction of the total indicated correction needed. Another embodiment of the invention utilizes a correction in the mill feed rate which, likewise, is smaller than the indicated required correction but varies with the magnitude thereof. Any one rate indication may not be representative of the actual feed rate and, hence, if a total correction is made, it will likely over compensate. Also, the act of changing the feed rate will cause a density change in the main conveyor which shortly invalidates the accuracy of the feed setting even if it were correct when first made. Hence, applying a small correction in the black feed rate in the proper direction at regular short intervals in accordance with the invention effects closer control of production and more uniform product than has heretofore been possible.

A more complete understanding of the invention may be had from a consideration of the accompanying drawing, of which Figure 1 is a schematic plan of an arrangement of apparatus in accordance with the invention; Figure 2 is a schematic wiring circuit of a reversible variable speed controller for use in the apparatus of Figure 1; Figure 3 is a schematic plan of a reversible constant-speed controller for use in the apparatus of Figure 1; and Figure 4 is a schematic plan of pneumatic controls for use in the apparatus of Figure 1.

Referring to Figure 1, a conventional horizontal, rotating cylindrical pellet mill 11 has a feed conveyor 12 (commonly a pair of screw conveyors) which connects with a main feed conveyor 13 leading to several mills. Conveyor 12 operates at a speed sufficient to feed into the mill all of the black which it receives. A star valve 14 between feed conveyor 12 and chute 15 regulates the flow of loose black from conveyor 13 to conveyor 12 and therefore the feed into mill 11. An effluent pellet line 16 receives pellets from the mill and a portion of the effluent stream passes thru conveyor 17 to a constant weight feeder 18 which passes the recycle pellets to recycle conveyor 19 for relivery to the feed end of the mill.

Product pellets pass from effluent line 16 over a standard weigh meter 21 from which the pellets pass to product storage or to shipping facilities. Conveyor 17 may connect with the pellet product line or conveyor downstream of weigh meter 21. Weigh meter 21 has a rate-of-flow indicating meter 22 from which a pneumatic signal of an intensity directly proportional to the rate of flow passes thru line 23 to a bellows 24 which is sensitive to variations in the strength or intensity of the signal. An air supply line and a bleed line (not shown) are part of the structure of the weigh meter. Variations in the pneumatic pressure in line 23 effect a movement of connecting arm 26 which is the operating arm of reversible controller 27 which is operated by a suitable electric current source 28 and which controls the direction of rotation of reversible motor 31. Motor 31 is connected to a standard gear box 32 by a linkage 33 having therein electric clutch 34. Limit switches 36 are connected in circuit with clutch 34 and are positioned so as to disengage the clutch when arm 37 rotating on gear wheel 38 contacts one of the limit switches. An automatic timer 39 is connected in circuit with electric clutch 34 and with a suitable power source (not shown) so as to periodically cause the engagement of clutch 34 and completion of linkage 33 with gear box 32 for a predetermined short period of time which effects only a fraction of the required or indicated correction in the feed to the pellet mill.

A connecting rod 41 operating on an eccentric 42 on gear wheel 38 connects with a pressure controller 43 and serves as the regulating arm thereof. Controller 43 connects with air supply line 44 and with air line 46 which leads to a pneumatic controller 47 on a variable-speed drive 48. Variable-speed drive 48, which may be either a variable-speed motor or a constant speed motor with a speed-reducing drive, connects by a drive belt 49 or other suitable driving means with the drive wheel or gear of star feeder 14.

Device 27 may be either a reversing switch, such as that of Figure 3, or a reversible variable-speed controller, such as that shown in Figure 2. The former functions to make a predetermined small fixed adjustment or correction in the feed rate by varying the speed of feeder 14, while the latter varies the adjustment or correction in proportion to the variation of product flow rate from the standard or normal flow but still makes only partial adjustment to avoid over-compensation.

Referring to Figure 2, reversible variable-speed controller 27 comprises a rider 56 to which connecting arm 26 attaches as the actuating means and a pair of resistors 57 and 58 over which the rider 56 moves when actuated by bellows 24 by means of connector 26. Another pair of resistors 61 and 62 connect with resistors 57 and 58, respectively, by means of insulators 59. The opposite ends of resistors 57 and 58 are connected to motor 31 by means of lines 63 and 64, respectively. The opposite ends of resistors 61 and 62 make a crossover connection with lines 64 and 63, respectively. When rider 56 is positioned across insulators 59, the controller is in the neutral position. As rider 56 moves to the left on a weak signal from weigh-meter indicator 22 and contraction of bellows 24 and first contacts resistors 57 and 58, the current passing from current source 28 passes thru a greater portion of resistors 57 and 58 in passing thru the circuit with motor 31 than it does as rider 56 continues to move to the left and the amount of resistance is decreased. Hence, as rider 56 moves to the left, the amount of current flowing thru the circuit increases, thereby increasing the speed of motor 31. Upon movement of rider 56 to the right so as to bring contacts 55 into contact with resistors 61 and 62, at first the full resistance is in circuit and a small amount of current is passed thru motor 31 in the opposite direction to the direction of the current flowing thru the motor when the rider is on resistors 57 and 58, because of the crossover connection of resistors 61 and 62 with lines 64 and 63, respectively. Likewise, as rider 56 moves farther to the right the amount of current flowing thru the circuit is stepped up so as to effect a greater motor speed.

Referring to Figure 3, device 27 comprises a rider 65 having a pair of contacts separated by an insulator 66 connected to actuating arm 26. Rider 65 connects with the terminals of a battery or current source 28 and contacts either of two pairs of conductors 67 and 68 of a reversing switch 69. Reversal of current is effected by the cross connectors 71 and 72 which reverse the direction of current flowing thru leads 63 and 64, connected with motor 31, when rider 65 moves from conductors 67 to conductors 68 and vice versa. Of course, movement of rider 65 is effected thru its connection with bellows 24 by means of connecting arm 26 and is actuated by fluctuations in fluid pressure in line 23. Any suitable reversing switch may be utilized as device 27.

Referring to Figure 4, an orifice 76, or other suitable flow reducer, is disposed in line 23 which is connected directly with controller 47 on motor 48. A normally closed valve 77 in line 23 is periodically opened for a short time by timer 39. Valve 77 may be a solenoid type valve electrically operated by current supplied thru timer 39 or from any suitable source placed in circuit periodically by timer 39. Valve 77 may also be pneumatically or hydraulically operated, the operating mechanism being actuated by timer 39. A surge chamber 78 is connected to line 23 by means of line 79 and adds volume to the system so as to prolong the flow of gas thru valve 77 when same is opened and a differential exists between the pressures each side of the valve. Orifice 76 may be located either side of valve 77 and surge tank 78 must be between valve 77 and controller 47.

In operation of the device or apparatus shown in Figure 1 as modified by Figure 2, as the flow rate of product pellets over weigh meter 21 deviates from a standard predetermined flow rate, the intensity or pressure of the pneumatic signal indicated at 22 and exerted in line 23 varies from a standard value or pressure comparable or directly proportional to the standard pellet flow rate desired. Variations in pressure in line 23 are transmitted to bellows 24 so as to move linkage 26 to the right when pneumatic signal is stonger than standard and to the left when weaker than standard. Movement of linkage 26 actuates reversible variable-speed controller 27 as described in connection with Figure 2 so as to turn motor 31 at increasing speeds in one direction when the pneumatic signal is stronger than standard and at variable speeds in the opposite direction when the pneumatic signal is weaker than standard. Motor 31, in the arrangement shown, is in continuous operation when the pneumatic signal from the weigh meter is off standard in either direction and is stationary when the signal is standard, because of the positioning of rider 56 on insulators 59 in the neutral position. In order to make a periodic change or compensation in the flow rate of feed to the pellet mill in response to the signal from weigh meter 21, motor 31 is periodically connected by a linkage 33 with a gear system such as a standard gear box 32 but this connection is broken by clutch 34 when this clutch is not actuated. Timer 39 periodically, as desired, actuates clutch 34 for a short period of a few seconds so as to permit only partial compensation in the feed to the mill for deviations in the flow rate of pellets over weigh meter 21 from the standard flow rate of pellets desired. Timer 39 is adjustable as to the length of the period between actuations of clutch 33 and also as to the length of time of engagement of the clutch 34 and therefore of duration of the linkage of motor 31 with gear box 32. Timer 39 can be readily adjusted so as to effect any fraction of the indicated needed correction in the feed flow rate in order to restore the product flow rate to the standard rate. The interval of actuation by timer 39 is preferably in the range of 10 to 30 minutes and the time of contact is preferably such as to effect an adjustment in feed rate equivalent to from ⅛ to ½ of that indicated.

Actuation of clutch 34 when motor 31 is turning effects a momentary operation of the gear box and rotation of gear wheel 38, according to the setting of timer 39, so as to move control arm 41 of pressure controller 43 and thereby vary the air pressure in line 46 so as to actuate controller 47 on the variable-speed drive 48 which changes the speed of belt 49 and feeder 14 so as to partially compensate for the variation in product flow rate from the standard.

As the variation of the pellet flow rate from the standard decreases, the amount of periodic adjustment of the feed rate is automatically reduced because of the decrease in the speed of motor 31, and eventually rider 56 (Figure 2) is in the neutral position so that period adjustment of the feed rate is discontinued until the product flow rate again deviates from standard. It is also feasible to connect timer 39 in the circuit of power source 28 and controller 27 or to utilize an independent timer which actuates motor 31 only periodically as needed, e. g., every 10 to 30 minutes for a time in the range of 5 to 30 seconds.

A movement of ¼ inch in control arm 41, which is the linkage between gear wheel 38 and controller 42, provides a minimum to maximum setting and varies the pressure in line 46 from about 5 to 15 pounds. This variation in pressure offers sufficient flexibility and range of control of the speed of the feeder 14.

Operation of the process of the invention utilizing the reversing device of Figure 3 is similar to that obtained with the variable-speed reversing controller of Figure 2, the essential difference being in the constant speed of motor 31 effected by the reversing device and the fixed or constant adjustment or correction in the feed rate as contrasted with a proportional adjustment effected by the variable-speed reversing device of Figure 2. The resulting correction is of the same magnitude for each time interval and is only a portion of the indicated required correction as determined by weigh meter 21, except when the product flow rate is very close to standard and the apparatus is adjusted to make a relatively large correction, it may over compensate.

The apparatus of Figure 4 provides a periodic adjustment of the speed of motor 48 and therefore of the black feed rate which is only a fraction of the indicated required adjustment and is proportional thereto. Timer 39 periodically actuates valve 77 and opens same so that air flows thru the valve to effect a reduction in the pressure differential existing at any time interval between the air in line 23 on opposite sides of valve 77. Timer 39 is set to maintain valve 77 open only a few seconds so that the flow of air thru the valve does not completely equalize the pressure on opposite sides of the valve. Orifice 76 functions to reduce the flow rate of air during the partial equalization and surge tank 78 assists in effecting more gradual changes in the pressure in line 23 intermediate valve 77 and controller 47. Timer 39 can be set in accordance with the size of the orifice or choke 76 and the capacity of tank 78 so as to effect any suitable partial correction in the black feed rate thru variation in the pressure in line 23 intermediate valve 77 and controller 47. It is also feasible to connect line 23 with pressure controller 43 so that variations in pressure in line 23 intermediate valve 77 and the pressure controller are utilized to periodically actuate pressure controller 43 and thereby partially correct the flow rate of black by adjustment of the speed of motor 48 and feeder 14.

While the apparatus described automatically, periodically adjusts the feed rate of loose black to the pellet mill to partially compensate for the indicated correction necessary to restore the product rate to standard, the process of the invention may be performed independently of the automatic control apparatus described. In other words, the feed rate may be periodically adjusted by hand-regulating the speed of the variable-speed drive connected with the inlet feeder in response to readings periodically taken from flow rate indicator 22 of weigh meter 21. By hand operation of variable-speed drive 48 to compensate for a portion of the variation in product flow rate from a standard predetermined flow rate, improved pelleting is obtained and a more constant product flow rate is effected. However, the arrangement of apparatus described and shown in the drawing provides a more accurate and more dependable control which is effected automatically.

The various control elements described, with the exception of reversible variable-speed controller 27, are conventional and commercially available.

The recycle of pellets at a constant flow rate with constant weight feeder 18 eliminates any error in the control method which might arise from irregular and non-uniform recycle flow rates. It is essential to maintain a uniform recycle rate in order to render the described process effective in maintaining relatively constant product flow rate. The recycle stream may be taken off either upstream or downstream of weigh meter 21, but it must be a constant rate stream.

While the apparatus elements shown in Figure 1 comprise a combination of pneumatic and electric devices, the invention is not restricted to the specific arrangement of the specific devices shown. It is also feasible to utilize a weigh meter which sends out an electric signal, the intensity of which varies directly in proportion to the flow rate of pellets and this signal may be utilized to actuate a variable-speed electric motor actuated by a variable-speed controller such as 26 and connected with feeder 14 so as to periodically adjust the flow rate of feed to partially compensate for the deviation in the product flow rate from the standard.

Certain modifications of the invention will become apparent to those skilled in the art and the illustrative details disclosed are not to be construed as imposing unnecessary limitations on the invention.

I claim:

1. A process for regulating the flow rate of loose carbon black to a pelleting mill which comprises periodically measuring variations in flow rate of effluent pellets from said mill from a predetermined rate and periodically varying the flow rate of loose carbon black to said mill only a portion of the indicated correction necessary to restore the flow of pellets to said predetermined rate.

2. The process of claim 1 wherein the flow rate of loose black to said mill is varied at periods in the range of 10 to 30 minutes.

3. The process of claim 2 wherein the flow rate to said mill is varied an amount in the range of ⅛ to ½ of the indicated correction required.

4. A process for pelleting carbon black which comprises feeding loose carbon black to a rotating pelleting mill so as to produce pellets substantially at a predetermined rate; recycling a portion of the effluent pellets to the feed end of said mill at a fixed rate; periodically measuring the flow rate of the balance of the effluent pellets at least at intervals to obtain an indicated correction in loose black feed rate; as the density of the feed to the mill and the flow rate of effluent pellets varies, periodically varying the feed rate of loose black to said mill only a portion of the indicated correction necessary to restore the flow of pellets to said predetermined rate; and continuing such periodic variation in feed rate until restoration of said predetermined rate has been effected.

5. The process of claim 4 wherein a constant weight of pellets is recycled per unit of time thru a constant-weight feeding zone; the remaining pellets are passed thru a weight-indicating zone from which a signal of intensity proportional to the weight of pellets passing is sent out; and wherein the rate of flow of feed is adjusted at selected intervals in response to said signal.

6. A process for pelleting carbon black which comprises feeding loose black to a rotating pelleting zone so as to produce pellets substantially at a predetermined rate; recycling a portion of the effluent pellets from said zone at a measured constant rate and passing the remaining portion thru a weight-indicating zone which sends out a signal proportional to the rate of flow of the pellets, indicating a required correction in the feed flow rate of loose black to said mill in order to restore said predetermined rate; and as the density of the carbon black feed to said mill and the flow rate of effluent pellets varies from said predetermined rate, periodically making a correction in said feed flow rate of loose black in the range of about 1/8 to 1/2 of the indicated required correction.

7. The process of claim 6 wherein correction is made at intervals in the range of 10 minutes to 30 minutes.

8. A process for regulating the flow rate of loose carbon black to a pelleting mill which comprises measuring variations in flow rate of effluent pellets from said mill from a predetermined rate and periodically at short intervals varying the flow rate of loose carbon black to said mill a small fixed amount to partially compensate for said variations.

9. A process for pelleting carbon black which comprises feeding loose black to a rotating pelleting zone so as to produce pellets substantially at a predetermined rate; recycling a portion of the effluent pellets from said zone at a measured constant rate and passing the remaining portion thru a weight-indicating zone which sends out a signal proportional to the rate of flow of the pellets, indicating a required correction in the feed flow rate to said mill in order to restore said predetermined rate; and as the density of the carbon black feed to said mill and the flow rate of effluent pellets varies, making a correction at intervals in the range of 10 to 30 minutes in said feed flow rate in the range of about 1/8 to 1/2 of the indicated required correction.

References Cited in the file of this patent

UNITED STATES PATENTS

| | | |
|---|---|---|
| 1,146,956 | Ricketts | July 20, 1915 |
| 1,241,566 | Simmon et al. | Oct. 2, 1917 |
| 1,921,114 | Brackelsberg | Aug. 8, 1933 |
| 2,327,016 | Carney | Aug. 17, 1943 |
| 2,503,361 | Studebaker | Apr. 11, 1950 |
| 2,638,625 | Studebaker et al. | May 19, 1953 |